United States Patent
Mankame et al.

(10) Patent No.: US 12,240,527 B2
(45) Date of Patent: Mar. 4, 2025

(54) INFLATABLE-BASED PROCESS FOR CONTROLLING STRUCTURAL FOAM REINFORCEMENT MOLDING

(71) Applicants: GM Global Technology Operations LLC, Detroit, MI (US); The Board of Trustees of the University of Illinois, Urbana, IL (US)

(72) Inventors: Nilesh D. Mankame, Ann Arbor, MI (US); Ruoyu Sun, Champaign, IL (US); Girish Krishnan, Mahomet, IL (US)

(73) Assignees: GM GLOBAL TECHNOLOGY OPERATIONS LLC, Detroit, MI (US); THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 309 days.

(21) Appl. No.: 17/818,528

(22) Filed: Aug. 9, 2022

(65) Prior Publication Data

US 2024/0051606 A1     Feb. 15, 2024

(51) Int. Cl.
*B62D 25/04*     (2006.01)
*B29C 44/18*     (2006.01)
(Continued)

(52) U.S. Cl.
CPC .............. *B62D 25/04* (2013.01); *B29C 44/18* (2013.01); *B29C 44/587* (2013.01);
(Continued)

(58) Field of Classification Search
CPC ...... B62D 25/02; B62D 25/025; B62D 25/04; B29C 44/587; B29C 44/588;
(Continued)

(56) References Cited

U.S. PATENT DOCUMENTS

| | | | | |
|---|---|---|---|---|
| 4,610,836 A | * | 9/1986 | Wycech | B29C 44/386 156/196 |
| 4,902,458 A | * | 2/1990 | Trimble | B62K 19/16 280/281.1 |

(Continued)

FOREIGN PATENT DOCUMENTS

| | | |
|---|---|---|
| CN | 111941940 A | 11/2020 |
| DE | 1236176 A | 3/1967 |

(Continued)

OTHER PUBLICATIONS

GE Engineering Structural Foam DESIGN & Processing Guide, Ge Plastics, May 1999, pp. 2-97, United States of America.

*Primary Examiner* — Gregory A Blankenship
(74) *Attorney, Agent, or Firm* — Vivacqua Crane, PLLC

(57) ABSTRACT

A structural component for a vehicle includes a component including an interior surface defining a first hollow passage and a structural reinforcement contacting the interior surface of the component. The structural reinforcement and component define a cross-section and the structural reinforcement partially fills the cross-section. A process for forming the structural component including inserting a bladder into the first hollow passage defined by the interior surface of the component and inflating the bladder in the first hollow passage, forming a cavity between the bladder and the interior surface, filling the cavity with a polymer resin, and foaming the polymer resin. A system for forming a structural component for a vehicle includes a component including a first hollow passage defined by an interior surface of the component, a bladder insertable into the first hollow passage of the component, and a supply line connected to an interior of the bladder.

20 Claims, 9 Drawing Sheets

(51) Int. Cl.
*B29C 44/58* (2006.01)
*B62D 29/00* (2006.01)
*B29K 101/12* (2006.01)
*B29K 105/04* (2006.01)
*B29K 105/24* (2006.01)
*B29L 31/30* (2006.01)

(52) U.S. Cl.
CPC .......... *B29C 44/588* (2013.01); *B62D 29/002* (2013.01); *B29K 2101/12* (2013.01); *B29K 2105/048* (2013.01); *B29K 2105/24* (2013.01); *B29L 2031/30* (2013.01)

(58) Field of Classification Search
CPC . B29C 44/184; B29C 44/186; B29K 2101/12; B29K 2105/048; B29K 2105/24; B29K 2031/30
See application file for complete search history.

(56) References Cited

U.S. PATENT DOCUMENTS

| | | | |
|---|---|---|---|
| 5,043,114 A | 8/1991 | Saito et al. | |
| 5,332,178 A * | 7/1994 | Williams | B29C 70/446 244/133 |
| 5,591,078 A | 1/1997 | Filion et al. | |
| 6,321,793 B1 * | 11/2001 | Czaplicki | B29C 44/18 138/172 |
| 6,419,305 B1 * | 7/2002 | Larsen | B62D 25/04 296/193.06 |
| 6,471,285 B1 | 10/2002 | Czaplicki et al. | |
| 6,729,425 B2 | 5/2004 | Schneider et al. | |
| 6,786,533 B2 | 9/2004 | Bock et al. | |
| 6,923,499 B2 | 8/2005 | Wieber et al. | |
| 7,169,344 B2 * | 1/2007 | Coon | B29C 44/184 264/263 |
| 9,744,701 B2 | 8/2017 | Belpaire et al. | |
| 10,597,094 B2 * | 3/2020 | Meaige | B29C 44/18 |
| 10,687,634 B1 | 6/2020 | Kim et al. | |
| 2003/0184121 A1 * | 10/2003 | Czaplicki | B29C 70/745 156/244.14 |
| 2003/0201572 A1 * | 10/2003 | Coon | B29C 44/184 425/127 |
| 2009/0224587 A1 | 9/2009 | Lawall et al. | |
| 2012/0118424 A1 * | 5/2012 | Cannon | B62D 29/001 138/172 |
| 2014/0239546 A1 | 8/2014 | Santoni | |
| 2015/0151796 A1 * | 6/2015 | Berger | B29C 70/68 296/193.06 |
| 2015/0224899 A1 | 8/2015 | Menne, III | |
| 2016/0332583 A1 | 11/2016 | Subat et al. | |
| 2019/0106030 A1 | 4/2019 | Kim et al. | |
| 2019/0193373 A1 | 6/2019 | Alexander et al. | |
| 2019/0195427 A1 * | 6/2019 | Alexander | D03D 3/02 |
| 2020/0156711 A1 | 5/2020 | Workinger et al. | |
| 2023/0339375 A1 | 10/2023 | Mankame et al. | |
| 2023/0399055 A1 * | 12/2023 | Testa | B62D 29/001 |
| 2024/0051262 A1 * | 2/2024 | Mankame | B29C 44/1219 |
| 2024/0051606 A1 * | 2/2024 | Mankame | B62D 29/002 |

FOREIGN PATENT DOCUMENTS

| | | |
|---|---|---|
| DE | 3837221 A1 | 5/1989 |
| DE | 3826011 A1 | 2/1990 |
| DE | 69627772 T2 | 2/2004 |
| EP | 1057608 A2 | 12/2000 |
| EP | 1356911 A2 | 10/2003 |
| EP | 1499485 B1 | 4/2011 |
| EP | 2570450 A1 | 3/2013 |
| EP | 3165430 A1 | 5/2017 |
| SE | 509503 C2 | 2/1999 |
| WO | 9851481 A1 | 11/1998 |
| WO | 2008077944 A1 | 7/2008 |
| WO | 2015053377 A1 | 4/2015 |
| WO | 2022172257 A1 | 8/2022 |

* cited by examiner

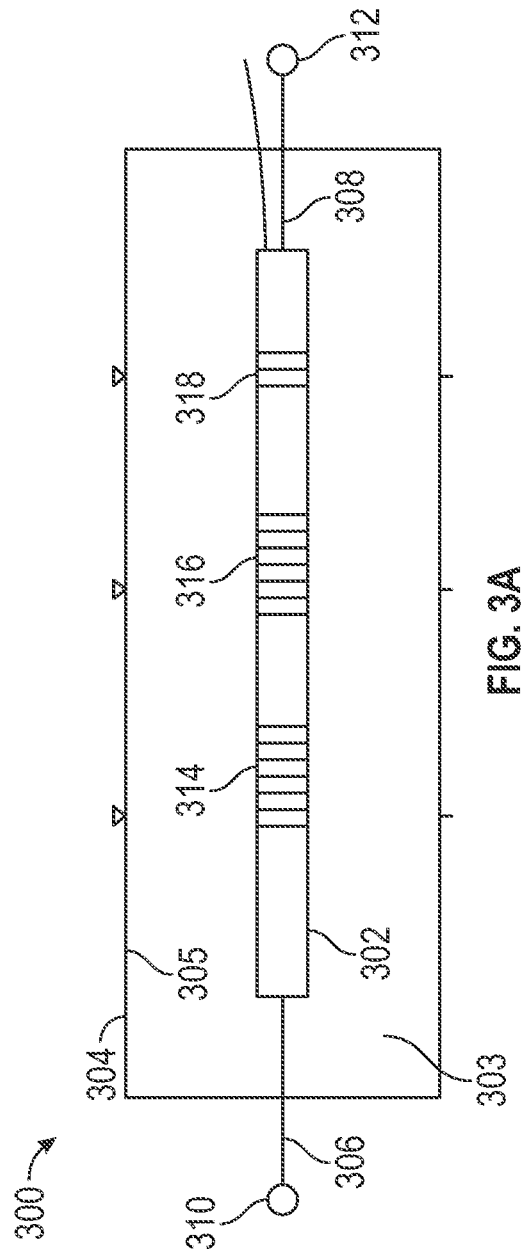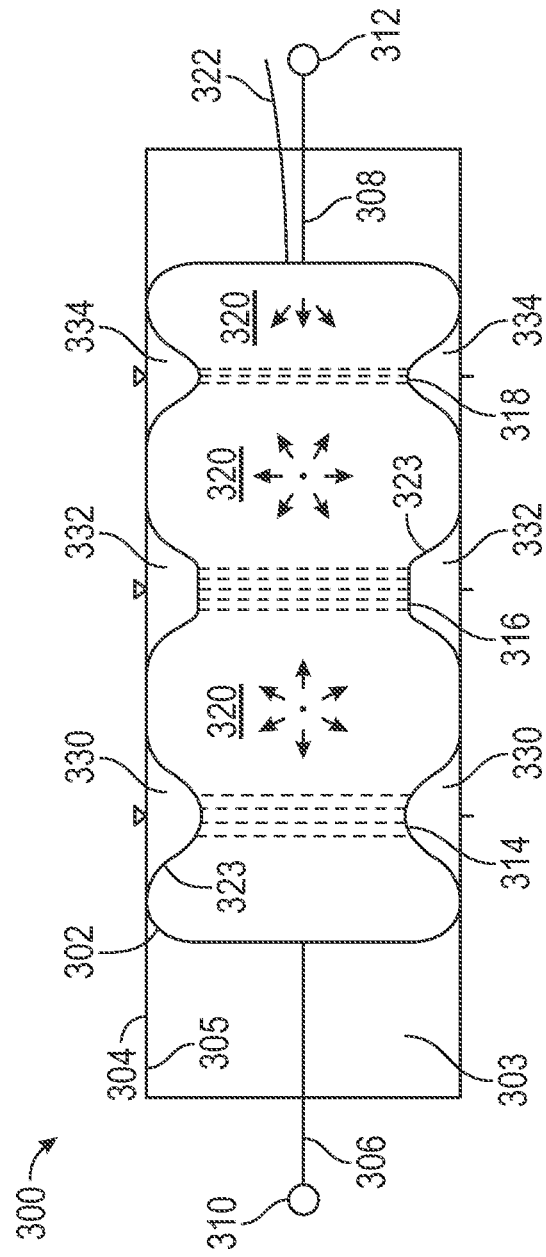

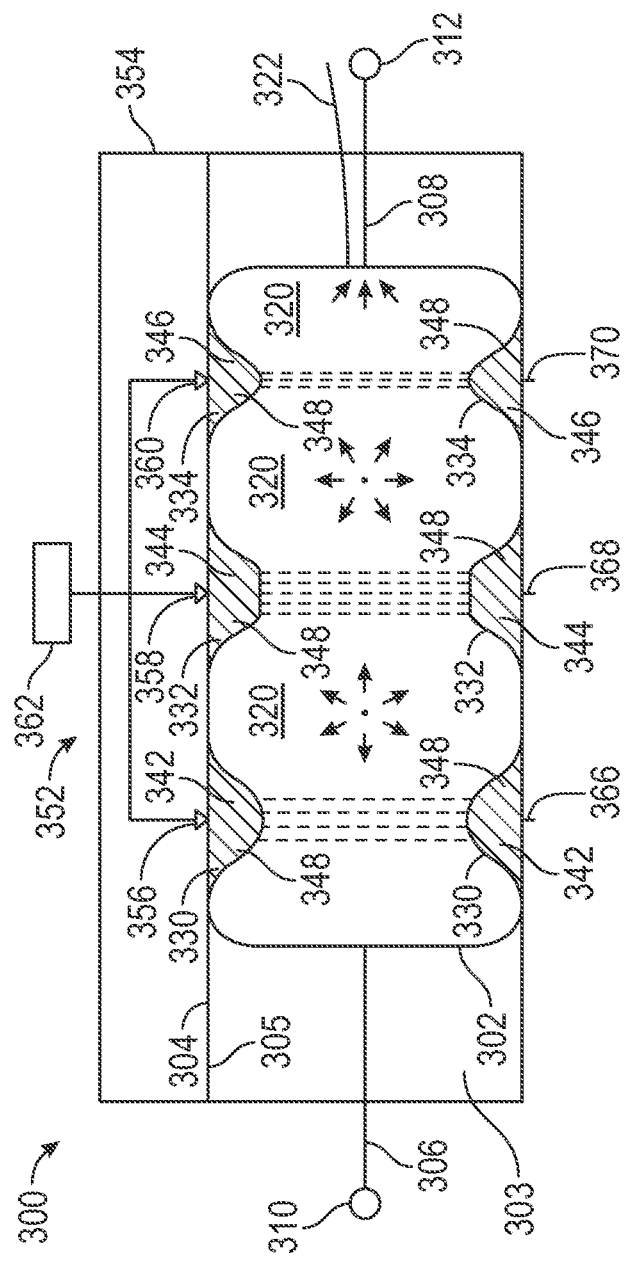
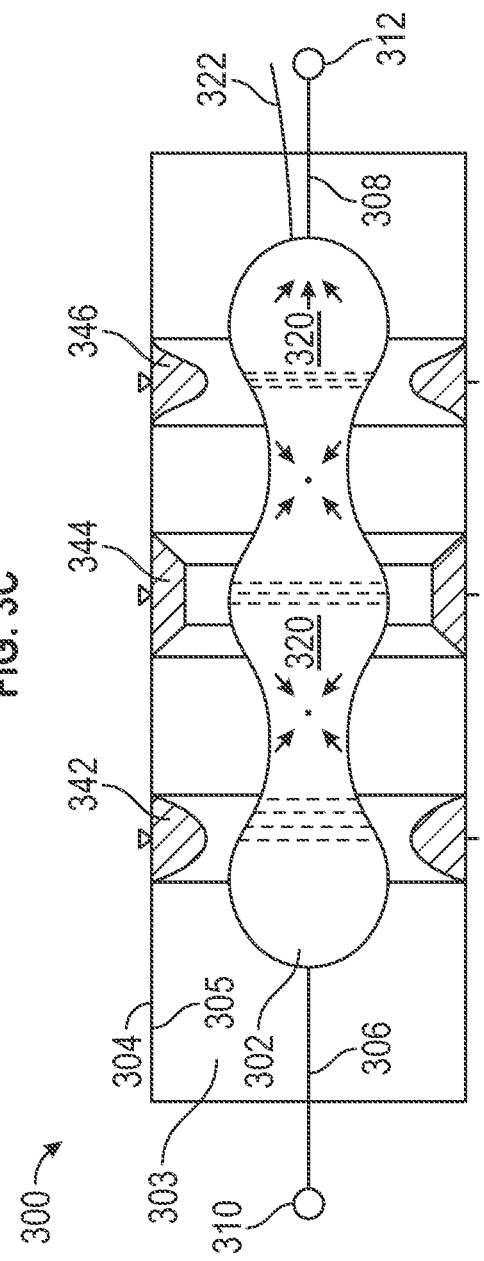

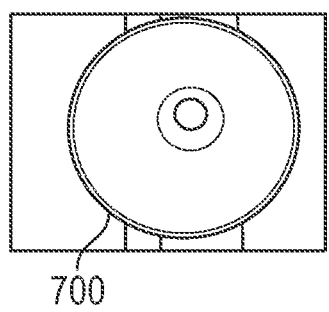
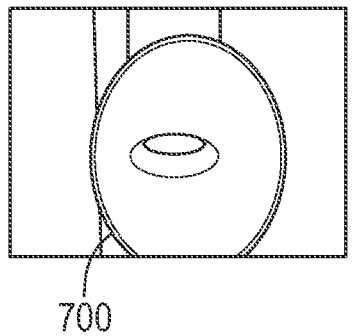
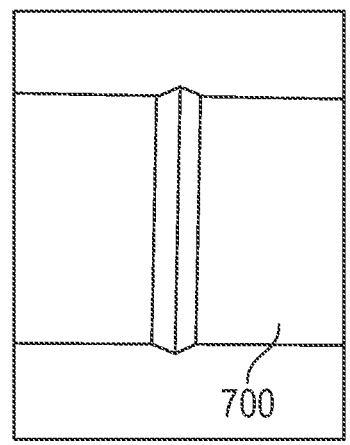
FIG. 7A         FIG. 7B         FIG. 7C
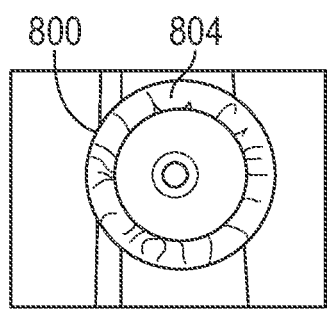
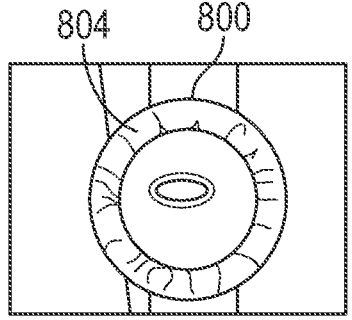
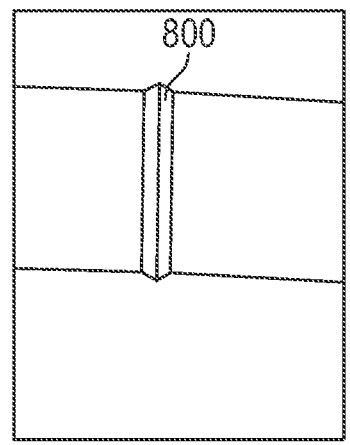
FIG. 8A         FIG. 8B         FIG. 8C
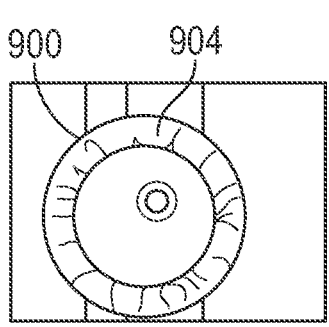
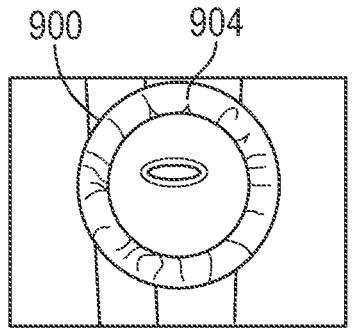
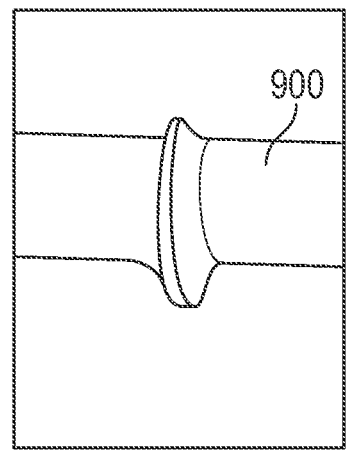
FIG. 9A         FIG. 9B         FIG. 9C

INFLATABLE-BASED PROCESS FOR CONTROLLING STRUCTURAL FOAM REINFORCEMENT MOLDING

Structural foam is used as a lightweight solution for reinforcing and strengthening vehicle structures. In various applications, structural foam is applied internally to hollow structural members. It can be used to manage collision energy forces as well as address noise, vibration, and harshness (NVH). Further, the use of foam is helpful in reducing vehicle weight, which improves fuel efficiency.

Structural foam is foamed in place and may be formed using low-pressure injection molding. In low-pressure injection molding the foam is introduced into a hollow passage in the structural component and free rises in place. Gravity may be used to restrict rise. However, in using this method, the foam fills the entire cross-section of the hollow passage. Further, if limited sections of the structural component include the structural foam or different materials are used for structural foam at different locations, it may be necessary to form each portion, or at least portions including different materials, in individual steps. This often requires multiple forming stations and forming cycles to fill a single component.

Accordingly, while current structural foam reinforcement processes achieve their intended purpose, there is a need for a new and improved system and process for foaming structural foam reinforcements.

SUMMARY

According to several aspects, the present disclosure relates to a process of forming a structural component for a vehicle. The process includes inserting a bladder into a first hollow passage defined by an interior surface of a component and inflating the bladder in the first hollow passage. The process also includes forming a cavity between the bladder and the interior surface and filling the cavity with a polymer resin. The process further includes foaming the polymer resin to form a polymer resin foam. In addition, the bladder is deflated and the bladder is removed from the first hollow passage.

In aspects of the above, the polymer resin foam partially fills the first hollow passage.

In any of the above aspects, the process further includes positioning the bladder within the cavity using a guide wire connected to the bladder.

In any of the above aspects, the process further includes forming a seal between the bladder and the interior surface to form the cavity.

In any of the above aspects, the process further includes providing a bladder including a restricted portion, wherein the restricted portion expands less than a remainder of the bladder upon inflating.

In any of the above aspects, the process further includes providing a bladder including an expandable portion, wherein the expandable portion expands a greater amount than a remainder of the bladder upon inflating.

In any of the above aspects, the process further includes modulating an inflation pressure of the bladder and modulating a shape of the bladder.

In any of the above aspects, the process further includes crosslinking the polymer resin in the cavity.

In any of the above aspects, the bladder includes a lobe and the process further comprises locating the bladder within the first hollow passage with the lobe.

In any of the above aspects, the process further includes venting the cavity through a vent defined by the component while foaming the polymer resin.

According to further aspects, the present disclosure relates to a system for forming a structural component for a vehicle. The system includes a component including a first hollow passage defined by an interior surface of the component. The system further includes a bladder insertable into the first hollow passage of the component, wherein the bladder is inflatable and contacts the interior surface of the component and defines a cavity when inflated. The system further includes a supply line connected to an interior of the bladder, wherein a fluid is provided to the interior of the bladder through the supply line for inflating the bladder.

In aspects of the above, the system further includes a port defined in the component for introducing a polymer resin foam into the cavity.

In any of the above aspects, the system includes a vent defined in the component for venting the cavity.

In any of the above aspects, the system includes a guide wire connected to the bladder to position the bladder in the component.

In aspects, the guide wire further includes attachment loops for securing the bladder in the component.

In any of the above aspects, the bladder includes a restricted portion.

In any of the above aspects, the bladder includes an expandable portion.

In aspects, the expandable portion forms a lobe extending from a primary body of the bladder, wherein the lobe locates the bladder in place within the first hollow passage of the component.

According to yet further aspects, the present disclosure relates to a structural component for a vehicle. The structural component includes a component including an interior surface defining a first hollow passage. The structural component also includes a structural reinforcement contacting the interior surface of the component, wherein the structural reinforcement and component define a cross-section and the structural reinforcement partially fills the cross-section.

In aspects of the above, the structural reinforcement defines a second hollow passage.

BRIEF DESCRIPTION OF THE DRAWINGS

The drawings described herein are for illustration purposes only and are not intended to limit the scope of the present disclosure in anyway.

FIG. 3A illustrates a structural component including a bladder, according to an embodiment of the present disclosure.

FIG. 3B illustrates the structural component including an inflated bladder, according to an embodiment of the present disclosure.

FIG. 3C illustrates the introduction of a structural reinforcement in cavities defined by the structural component and inflated bladder, according to an embodiment of the present disclosure.

FIG. 3D illustrates the structural reinforcement formed in the structural component and the deflated bladder, according to an embodiment of the present disclosure.

FIG. 7A illustrates a cross-section of a structural component without a structural reinforcement formed therein.

FIG. 7B illustrates a cross-section of the structural component of FIG. 7A after testing.

FIG. 7C illustrates a top view of the structural component of FIG. 7A after testing.

FIG. 8A illustrates a cross-section of the structural component including a structural reinforcement, according to an embodiment of the present disclosure.

FIG. 8B illustrates a cross-section of the structural component of FIG. 8A after testing.

FIG. 8C illustrates a top view of the structural component of FIG. 8A after testing.

FIG. 9A illustrates a structural component including a structural reinforcement, according to an embodiment of the present disclosure.

FIG. 9B illustrates a cross-section of the structural component of FIG. 9A after testing.

FIG. 9C illustrates a top view of the structural component of FIG. 9A after testing.

DETAILED DESCRIPTION

Figure 1A:
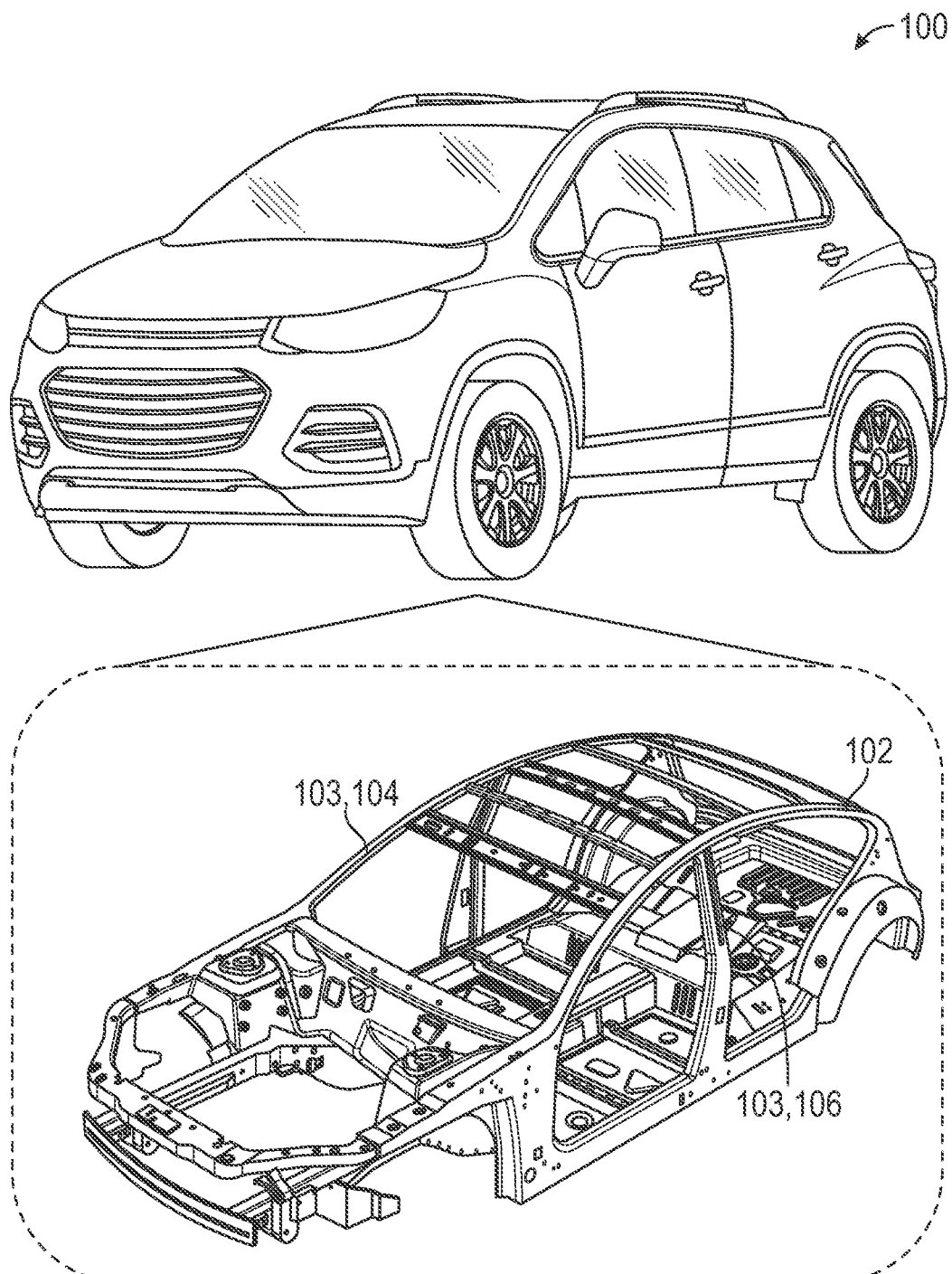
FIG. 1A illustrates a vehicle frame including several structural components in a vehicle according to embodiments of the present disclosure.

The following description is merely exemplary in nature and is not intended to limit the present disclosure, application, or uses. Furthermore, there is no intention to be bound by any expressed or implied theory presented in the preceding introduction, summary, or the following detailed description. It should be understood that throughout the drawings, corresponding reference numerals indicate like or corresponding parts and features.

As used herein, the term "vehicle" is not limited to automobiles. While the present technology is described primarily herein in connection with automobiles, the technology is not limited to automobiles. The concepts can be used in a wide variety of applications, such as in connection with motorcycles, mopeds, locomotives, aircraft, marine craft, and other vehicles, or other structural or non-structural applications where it may be desirable to deposit a polymer resin in passageways formed in components.

The present disclosure is directed to structural components including structural reinforcements, inflatable-based systems for forming structural reinforcements within structural components, and an inflatable-based process for controlling structural foam reinforcement molding. Structural components include components that perform at least one of the following functions: support vehicle weight, absorb road shock, and manage collision energy. A structural reinforcement is understood herein as material that improves a mechanical property of the structural component, such as a compression strength, flexural strength, tensile strength, or energy absorption capacity of the structural component.

Figure 1B:
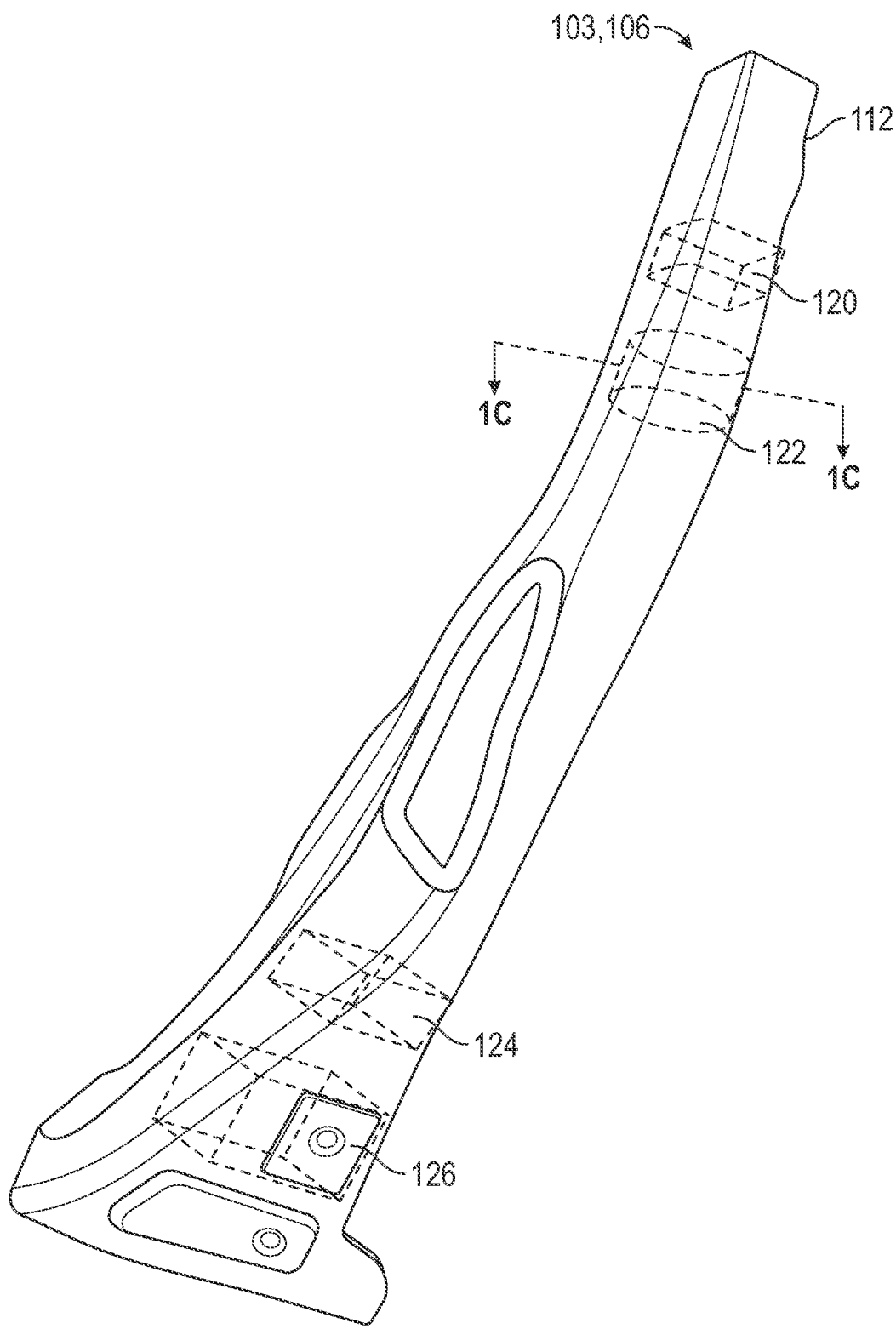
FIG. 1B illustrates a structural member from an automobile including structural reinforcements formed therein, according to an embodiment of the present disclosure.
Figure 1C:
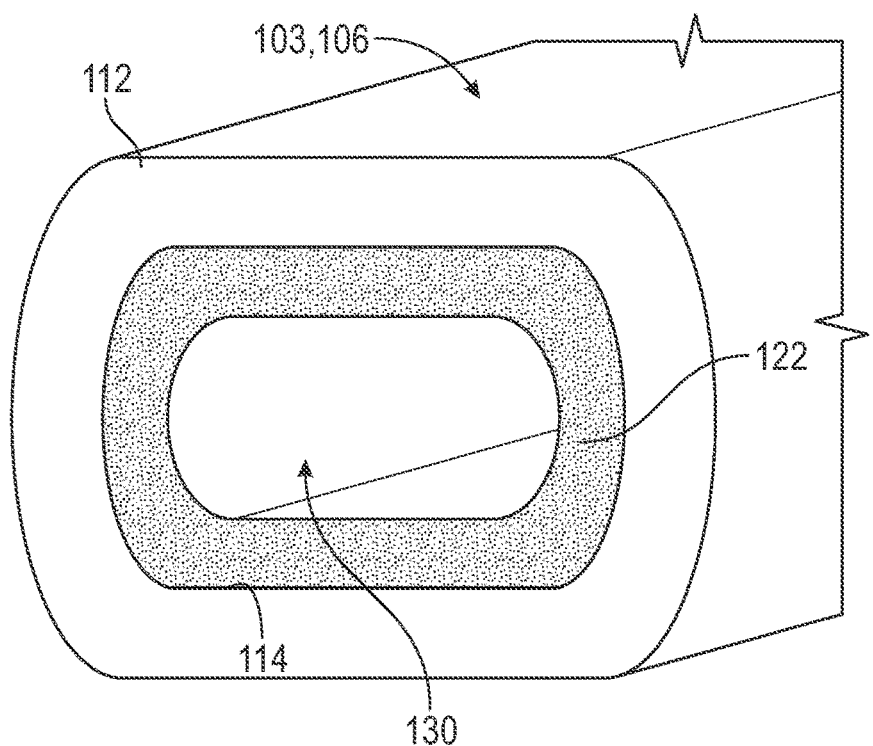
FIG. 1C illustrates a cross-section of the structural member of FIG. 1B, according to an embodiment of the present disclosure.

FIG. 1A illustrates a vehicle 100 including a body frame 102, the body frame 102 includes several structural components 103, such as the A-pillar 104 and the B-pillar 106. FIGS. 1B and 1C illustrate a B-pillar 106. The structural components 103 are formed from components 112 that include hollow passages. For example, the B-pillar 106 is formed from a component 112, which includes an interior surface 114 that defines a first hollow passage 116 within the component 112. The first hollow passage 116 is an elongate hollow passage. The structural reinforcements 120, 122, 124, 126 contact the interior surface 114 of the component 112, and are formed at different, discrete locations within the first hollow passage 116 of the component 112. In addition, the structural reinforcements 120, 122, 124, 126 are formed of polymer resin foam, which exhibits a cellular structure. As illustrated, four structural reinforcements are provided; however, it should be appreciated one or more structural reinforcements may be provided for a single structural component 103, such as between one and ten structural reinforcements. In addition, where multiple structural reinforcements may be present, the structural reinforcements may be made from a variety of materials, having varying compositions, physical properties, and mechanical properties.

The structural reinforcements 120, 122, 124, 126 only partially fill a given cross-section of the first hollow passage 116 of the component 112 and do not fill the entire cross-section of the first hollow passage 116. As illustrated in FIG. 1C, the structural reinforcement 122 fills a portion of the cross-section of the first hollow passage 116 and the structural reinforcement is hollow, defining a second hollow passage 130. In other aspects, the structural reinforcement 122 fills a portion of the cross-section of the first hollow passage 116 and a second hollow passage 130 is defined by both the structural reinforcement 122 and the component 112. In aspects, the structural reinforcement 122 occludes in the range of 5 percent to 90 percent, including all values and ranges therein, of a given cross-section of the first hollow passage 116. Partial filling of the component 112 with the structural reinforcements reduces the weight of the structural components 103 as compared to fully filling the structural component 103 with the structural reinforcement 11, contributing to a reduction in weight of the entire vehicle 100.

Figure 2:
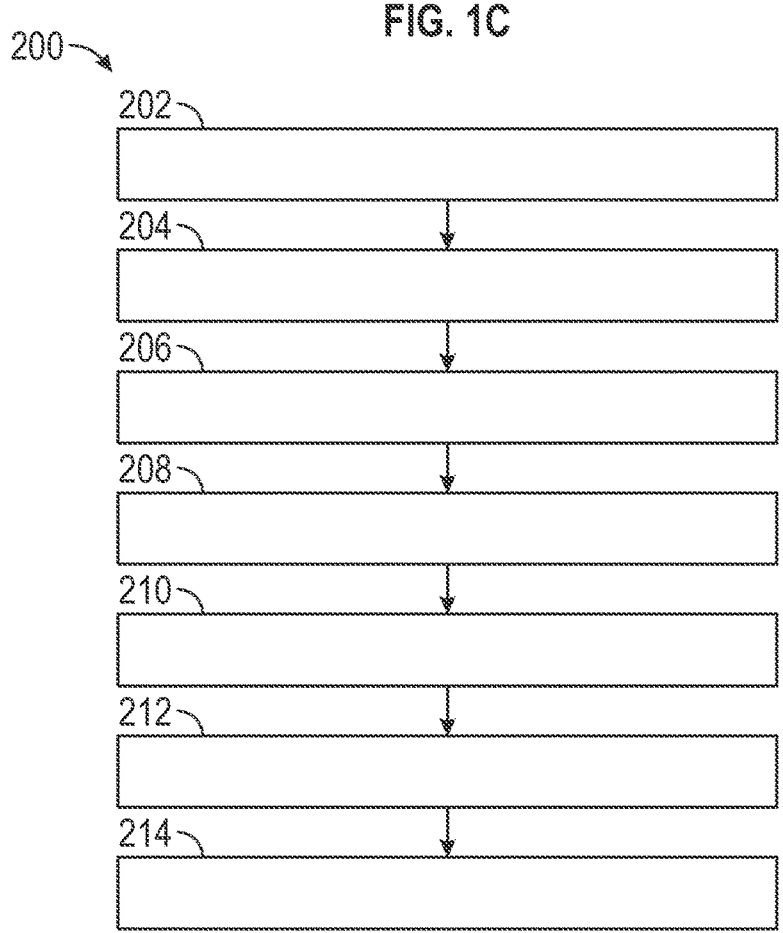
FIG. 2 illustrates a process for forming a structural reinforcement included in structural component, according to embodiments of the present disclosure.

A process 200 for molding the structural reinforcements 120, 122, 124, 126 within a structural component 103 is illustrated in FIG. 2, with reference to FIGS. 3A through 3E, which illustrate a system for foaming a structural component 103 for a vehicle. The process 200 begins at block 202 by inserting an uninflated, insertable bladder into a first hollow passage 303 defined by the interior surfaces 305 of the component 304 of a structural component 300. The uninflated bladder 302 includes guide wires 306, 308 connected to the bladder 302 and extending from either side of the bladder 302 to assist in positioning the bladder 302 within the component 304. The guide wires 306, 308 also include attachment loops 310, 312 for securing the bladder 302 in place to prevent movement of the bladder 302 in the component 304 during the molding process. The attachment loops 310, 312 may be connected to the structural component 300 or to a fixture retaining the structural component 300 in place during the molding process. In aspects, the bladder 302 is formed from silicone, polypropylene, polyamide-reinforced polypropylene, or rubber. In additional aspects, the bladder 302 is coated with a mold-release compound or otherwise treated to prevent or at least reduce adhesion to the polymer resin foam.

The bladder 302 further includes restricted portions, 314, 316, 318, which exhibit less expansion than the remainder of the bladder 302 when the bladder 302 is inflated. The restricted portions 314, 316, 318 may be formed by winding thread, wire, bands, or elastic around the bladder 302 or by forming the restricted portions 314, 316, 318 of the bladder 302 with one or more different materials that exhibit different degrees of extensibility or deformation when a force is applied against the bladder 302 by the fluid 320 inflating the bladder 302. In addition, localized constraints, such as seams, tethers, and other stitching may also influence the inflated shape of the bladder 302 and provided restricted portions constraining expansion of the bladder 302. By altering the number or locations of the windings or by using different materials, different geometries of the bladder 302 and structural reinforcements 120, 122, 124, 126 may be formed. Thus, while three restricted portions are illustrated, any number of restricted portions may be provided, such as one restricted portion up to ten restricted portions. Further, it should be appreciated that while restricted portions are illustrates as extending around the entire periphery of the bladder 302, the restriction portions may be limited to segments of the bladder periphery.

Figure 4:
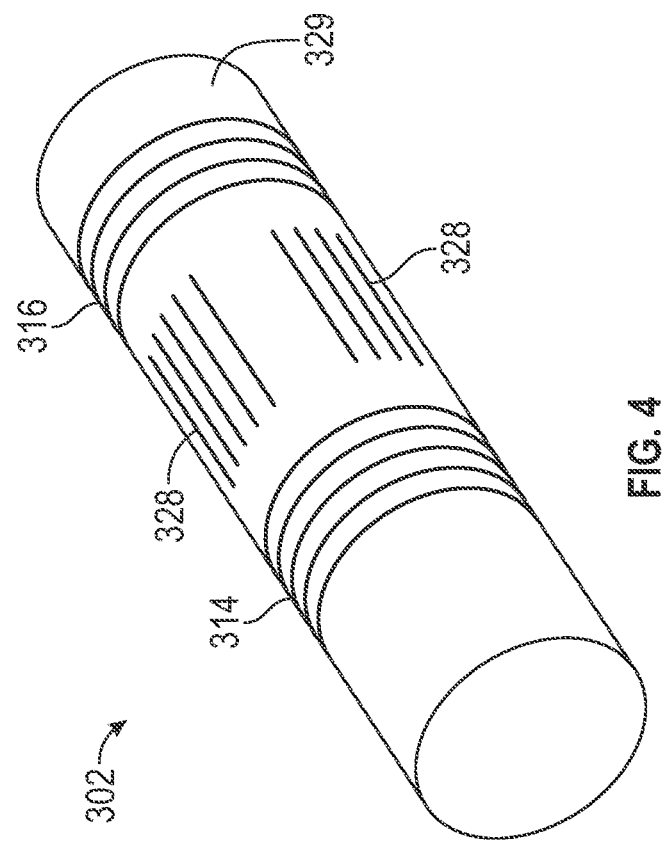
FIG. 4 illustrates a bladder including regions exhibiting anisotropic properties to form different bladder shapes, according to an embodiment of the present disclosure.
Figure 5:
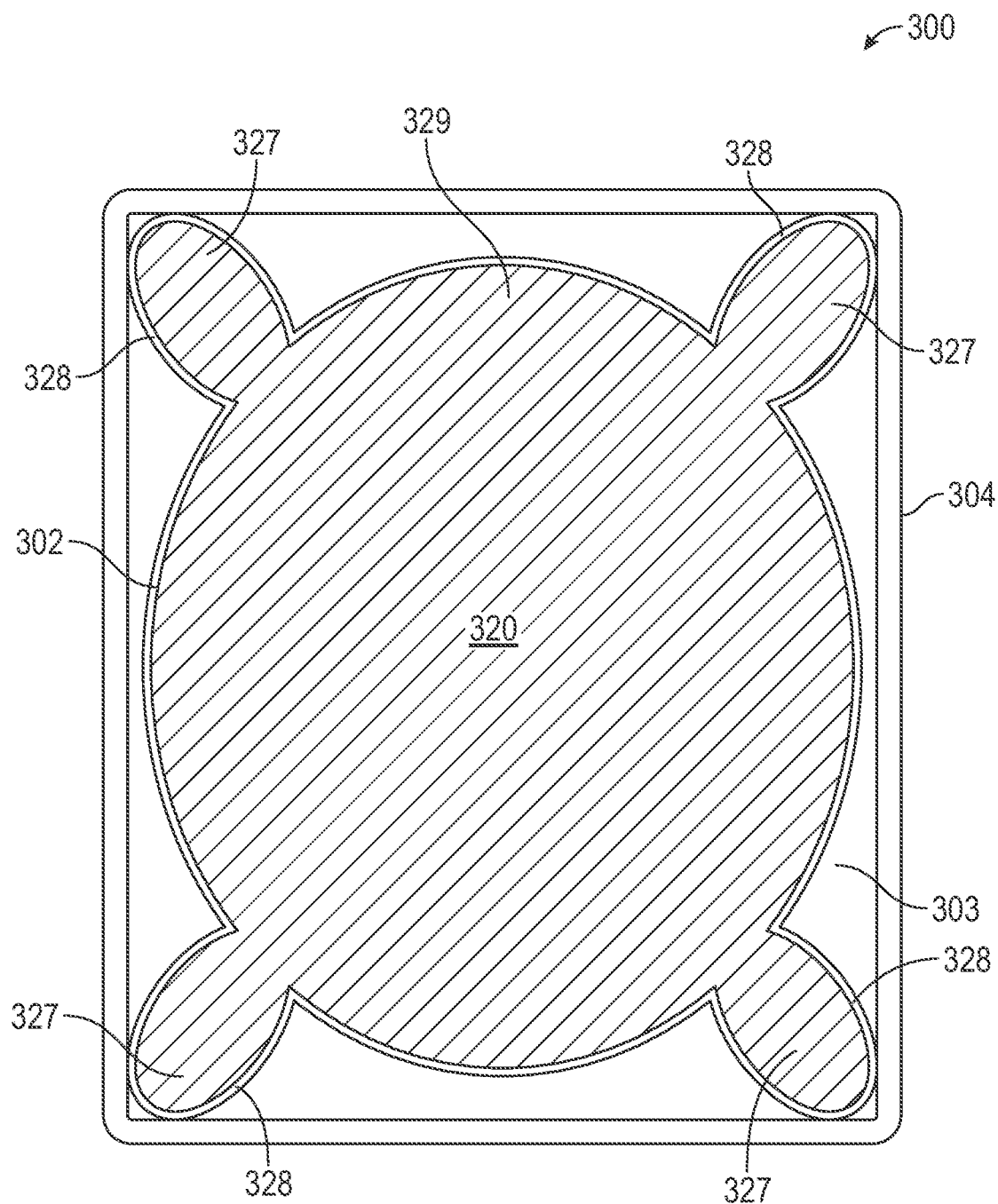
FIG. 5 illustrates a cross-section of a structural component including structural reinforcement formed using a bladder exhibiting anisotropic properties, according to an embodiment of the present disclosure.

In addition to restricted portions, expendable portions may also be provided, and reference is made to FIG. 4, which illustrates a bladder 302 that includes restricted portions 314, 316 and expandable portions 328. As noted above, the restricted portions 314, 316, 318 restrict the degree to which the bladder 302 may inflate in given regions relative to the other portions of the bladder 302. The expandable portions 328 expand to a greater degree relative to other portions of the bladder 302 when the bladder is inflated. The expandable portions 328 exhibit different deformation characteristics, i.e., greater deformation and greater extensibility, than the remaining portions of the bladder 302 when the bladder 302 is filled with a fluid. These expandable portions 328 of the bladder 302 are formed by altering the materials or the thickness of the wall sections. When inflated, the portions 328 produces lobes 327 extending from the primary body 329 of the bladder 302 illustrated in FIG. 5, which is a cross-section of the inflated bladder 302 within a component 304. In the illustrated aspect, the lobes 327 locate the bladder 302 within the first hollow passage 303 and hold the bladder 302 in place within the first hollow passage 303 of the component 304. The combination of the restricted portions 314, 316, 318 and expandable portions 328 may be arranged and adjusted to form any number of geometries when the bladder 302 is inflated. Thus, while four lobes 327 are illustrated, any number of lobes 327 may be provided.

At block 204, and with reference to FIG. 3B, the bladder 302 is inflated to a given pressure by filling the bladder 302 with a fluid 320, such as air, an inert gas, or a liquid, through a supply line 322 connected to the interior 323 of the bladder 302. The bladder 302 contacts and impinges on the interior surface 324 of the component 304 and forms a seal with the interior surface 324 of the component 304 to define a plurality of cavities 330, 334, 336 between the interior surface 305 of the component 304 and the bladder 302. It should be appreciated that while multiple cavities are illustrated one cavity or two or more cavities may be defined. In aspects, the temperature of the fluid 320 may be regulated, such as by circulating the fluid through a chiller or a heater, to facilitate the molding of the structural reinforcements through assisting in curing or cooling the resin later introduced into cavities 330, 332, 334. In aspects, the inflation pressure in the bladder 302 is modulated to modulate the shape of the bladder 302. Modulation may occur while the cavities 330, 332, 334 are being filled with the polymer resin or while foaming the polymer resin foam 348.

After filling the bladder 302 at block 204, at block 208 the cavities 330, 332, 334 are filled with a polymer resin forming the polymer resin foam 348, which creates the structural reinforcements 342, 344, 346. In aspects, the polymer resin evolves gas to form a polymer resin foam 348 through a chemical reaction, or the polymer resin includes blowing agents or expandable particles in the polymer resin. In aspects, the foaming may be triggered upon heating the polymer resin. Examples of polymer resin foams 348 include, for example, one-part or two-part foams, thermoplastic materials that include expandable particles or blowing agents, or thermoplastic materials that are mixed with a gas after melting and prior to molding. Polymer resins used to form polymer resin foams 348 include, e.g., one or more of: polyurethane, epoxy, polyisocyanurate, ethylene vinyl acetate, polyolefin, polyolefin-ethylene vinyl acetate blends, polybutylene terephthalate, polycarbonate, polyphenylene oxide, polyethylene terephthalate, and acrylonitrile butadiene styrene. As noted above, more than one polymer resin foam 348 may be used when a given structural component 300 includes multiple structural reinforcements 342, 344, 346. Different polymer resins may be used to form the polymer resin foam 348 of each structural reinforcement or the same polymer resin with different amounts of foaming agent may be used. The different polymer resin foams 348 may exhibit different densities or different mechanical properties including compression strength and tensile strength. In additional or alternative aspects, different amounts of polymer resin may be injected into a given cavity to provide polymer resin foams of different densities.

The polymer resin forming the polymer resin foam 348 is introduced by a runner system 352. In aspects, the runner system 352 is formed in one or more fixtures 354 the component 304 is retained against. In other aspects, the runner system 352 is formed from tubing that is connectable to the component 304. The component 304 defines a number of ports 356, 358, 360 connected to the cavities 330, 332, 334 and connectable to the runner system 352 for introducing the polymer resin of the polymer resin foam 348 into cavities 330, 332, 334, before or after foaming the polymer resin. Further, the runner system 352 is connected to a polymer resin supply 362. In aspects, the polymer resin supply 362 includes one or more of the following: supply drums, accumulators, metering pumps, feeders, extruders, and mixers. In aspects, each port 356, 358, 360 is connected to its own runner system 352, which is in turn connected to its own polymer resin supply 362 and each polymer resin supply 362 is individually metered to allow a different amount of precursor to be injected into each site. This allows control over the density of the polymer resin foam 348 in each cavity 330, 332, 334. Further, vents 366, 368, 370 are defined in component 304 and connected to the cavities 330, 332, 334 to vent air out of the cavities 330, 332, 334 as the polymer resin of the polymer resin foam 348 is being injected into the cavities 330, 332, 334.

In optional aspects, prior to filling the cavities 330, 332, 334 at block 208, at block 206 the polymer resin is melted, multiple components of the polymer resin is mixed, or the resin is combined with a gas. For example, when a thermoplastic resin is used, the polymer resin is melted through the application of heat and, in some aspects, combined with gas. In another example, when a two-component resin, such as polyurethane or epoxy, is used, the resin components are mixed. Or, in alternative aspects, the polymer resin is introduced without pre-treatment such as melting, mixing, or combining with a gas, such as in the case of a one-part polyurethane.

After filling the cavities 330, 332, 334 with the polymer resin of the polymer resin foam 348 at block 208, the polymer resin is crosslinked or solidified in the cavities 330, 332, 334. For example, where the polymer resin is a two-component mixture, the polymer resin may form cross-links and solidify into the polymer resin foam 348. In other examples, the polymer resin is heated to initiate cross-linking, or kick-off a blowing agent in a polymer resin in a melt state or expand expandable particles in the polymer resin in a melt state, to cause the evolution or expansion of gasses, forming the polymer resin foam 348. When the polymer resin of the polymer resin foam 348 is provided as a melt, the foamed polymer resin may cool and solidify. It should be appreciated that the polymer resin does not need to be completely crosslinked or completely cooled to ambient temperature but crosslinked sufficiently or cooled sufficiently so that the structural reinforcements 342, 344, 346 resist deformation upon removal of the bladder 302.

Figure 3E:
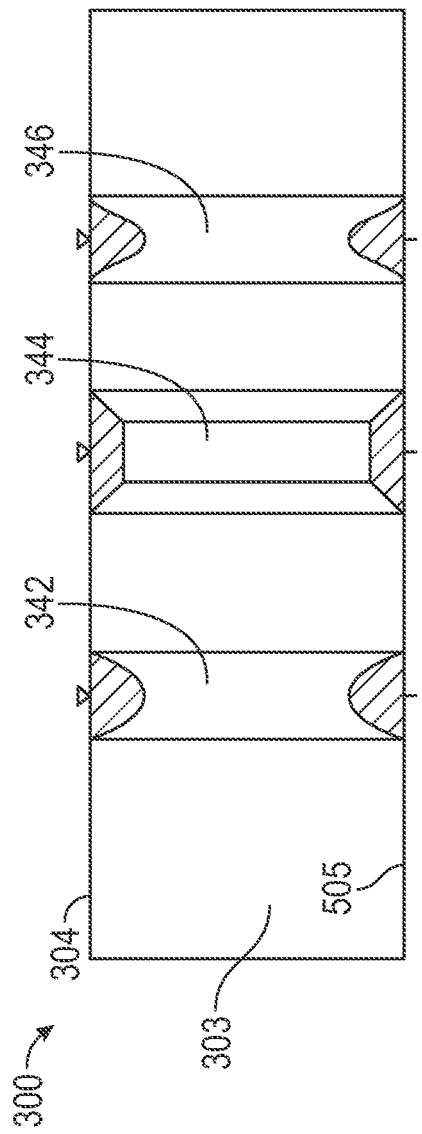
FIG. 3E illustrates the structural component including a plurality of structural reinforcements formed in the structural component after removal of the deflated bladder, according to an embodiment of the present disclosure.

With reference to FIGS. 3D and 3E, once the polymer resin foam 348 is sufficiently solidified at block 210, at block 212 the bladder 302 is deflated and at block 214 the bladder is removed from the structural reinforcement 342, 344, 346. In aspects, the bladder 302 may be deflated by pumping the liquid out of the bladder 302 or by simply reducing the pressure applied to the fluid 320 in the bladder 302 by the elastic recovery of the bladder 302 or an external source. The structural component 300 is formed from the component 304 and the structural reinforcements 342, 344, 346. As illustrated, the structural reinforcements 120, 122, 124, 126, 342, 344, 346 assume a variety of shapes depending on the shape of the component 112, 304 and the bladder 302.

Figure 6:
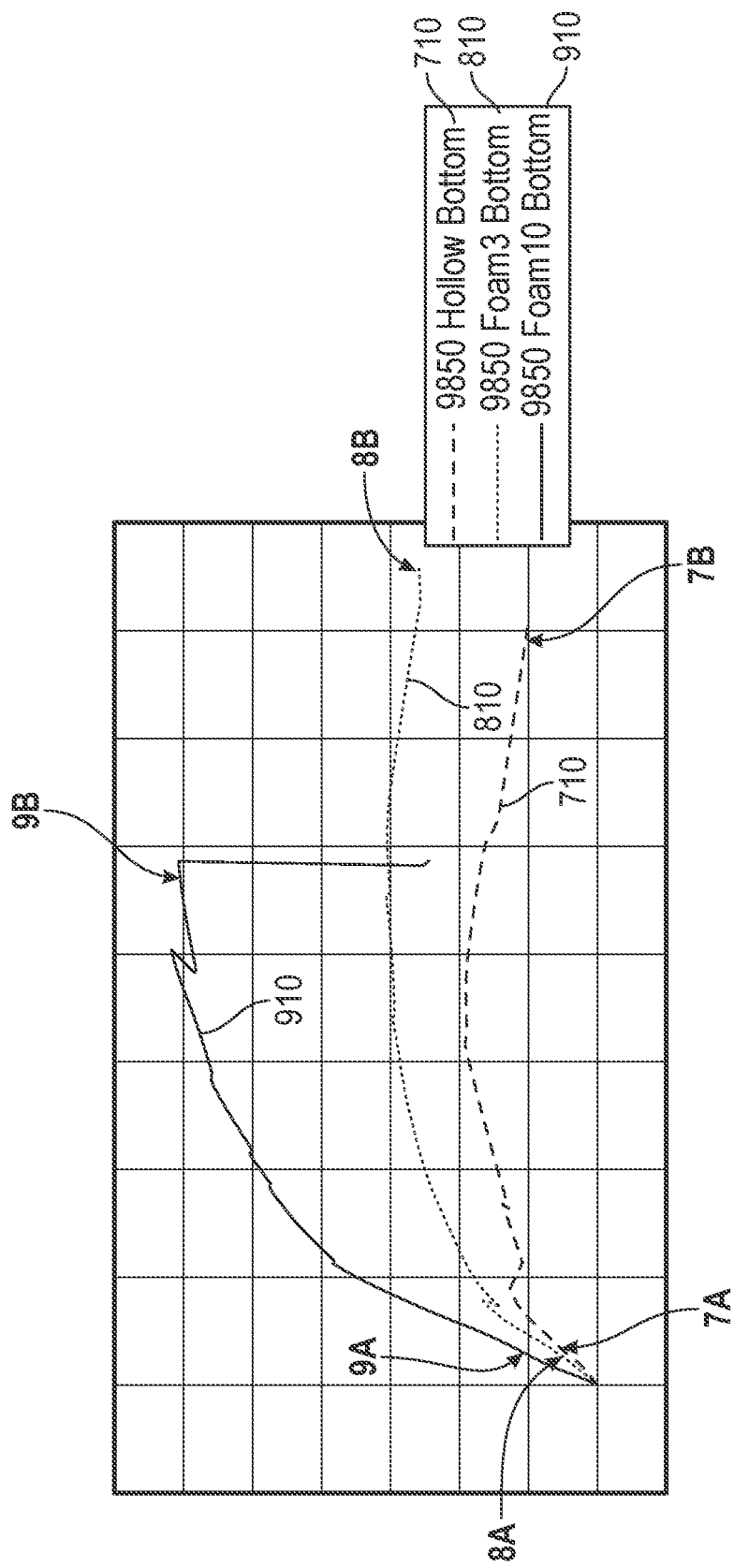
FIG. 6 is a graph illustrating the effect of the addition of structural reinforcements to a structural component, according to an embodiment of the present disclosure.

The inclusion of the structural reinforcements 120, 122, 124, 126, 342, 344, 346 in the structural components 300 provides an increase in mechanical characteristics. An illustrative example is provided in FIGS. 6 through 9C, which is exemplary in nature and not meant to limit the scope of the present disclosure. FIG. 6 includes a graph illustrating the effect of a hollow structural component 700 versus structural components 800, 900 including structural reinforcements 804, 904. The structural components 700, 800, 900 are elongate pipes and are formed from polyetherimide (ULTEM 9085 available from SABIC, Houston, TX) using an FDM 3D printer exhibiting a wall thickness of 1 mm. Within the structural component 800 is provided a structural reinforcement formed from 3 lb/ft$^3$ (pounds per cubic foot) density polyurethane foam, extending along the length of the structural component 800 and having a foam thickness of 10 mm. Within the structural component 900 is provided a structural reinforcement formed from 10 lb/ft$^3$ density polyurethane foam, extending along the length of the structural component 900 having a thickness of 10 mm. FIGS. 7A, 8A and 9A illustrate the circularity of the structural components 700, 800, 900 prior to testing.

A force was provided on the structural components 700, 800, 900 using an Instron three-point bending frame. The structural components were fixed at two roller supports and indented by 30 Kilonewton (kN) load cell, which measured the deflection from the top surface. An extensometer was placed under the component to measure the deflection from the bottom. The force was applied at a rate of 3 millimeters per minute. As illustrated in the graph, the amount of force to cause the structural component 700 without a structural reinforcement to deform, plot line 710 was lower than the amount of force to cause the structural components 800, 900 including structural reinforcements 804, 904 to deform, plot lines 810, 910, respectively. FIGS. 7B, 8B, and 9B illustrate the pinching of the structural components 700, 800, 900, and loss of circularity, at failure. As illustrated, FIGS. 7C, 8C and 9C illustrate a top view of the resultant deformation 712, 812, 912 of in the structural components 700, 800, 900 at failure.

While the process described herein is described with relation to automotive structural members, it should be appreciated that the process may be used to incorporate structural reinforcements in other structural components that include or define hollow passages. Structural components include components that perform at least one of the following functions: support vehicle weight, absorb road shock, and manage collision energy. Structural components include, e.g., the various pillars (A, B, C, D) as noted above, radiator core support, front and rear bumper reinforcements, cross-members, seat frames, front, and rear door intrusion beams, etc. Further, it should be appreciated that the method used herein may be used for depositing other materials in hollow passages defined by other vehicle components, such as noise deadening material within air ducts.

The structural components including the structural reinforcements and method of forming the structural components including the structural reinforcements offer several advantages. As compared to molding methods that require free-rise and complete fill of the structural reinforcement in the structural component, the advantages include, for example, the ability to form multiple structural reinforcements in the structural component at a single time. This results in a reduction in cycle time to form a structural component including more multiple structural reinforcements, requiring multiple filling stations. Advantages further includes a reduction in weight due to the ability to partially fill of the structural reinforcement in the structural component. This results in a reduction in weight of the structural component, contributing to weight reductions in the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A process of forming a structural component for a vehicle, comprising:
   inserting a bladder into a first hollow passage defined by an interior surface of a component;
   inflating the bladder in the first hollow passage;
   forming a cavity between the bladder and the interior surface;
   filling the cavity with a polymer resin;
   foaming the polymer resin to form a polymer resin foam structural reinforcement contacting the interior surface of the component;
   deflating the bladder; and
   removing the bladder from the first hollow passage.

2. The process of claim 1, wherein the polymer resin foam structural reinforcement partially fills the first hollow passage.

3. The process of claim 1, further comprising positioning the bladder within the cavity using a guide wire connected to the bladder.

4. The process of claim 1, further comprising forming a seal between the bladder and the interior surface to form the cavity.

5. The process of claim 1, further comprising providing the bladder with a restricted portion, wherein the restricted portion expands less than a remainder of the bladder upon inflating.

6. The process of claim 1, further comprising providing the bladder with an expandable portion, wherein the expandable portion expands a greater amount than a remainder of the bladder upon inflating.

7. The process of claim 1, further comprising modulating an inflation pressure of the bladder and modulating a shape of the bladder.

8. The process of claim 1, further comprising crosslinking the polymer resin in the cavity.

9. The process of claim 1, wherein the bladder includes a lobe and the process further comprises locating the bladder within the first hollow passage with the lobe.

10. The process of claim 1, further comprising venting the cavity through a vent defined by the component while foaming the polymer resin.

11. The process of claim 2, wherein the polymer resin foam structural reinforcement is hollow and defines a second hollow passage.

12. The process of claim 11, wherein the polymer resin foam structural reinforcement occludes 5 percent to 90 percent of a cross-section of the first hollow passage.

13. The process of claim 11, wherein the second hollow passage is defined by the polymer resin foam structural reinforcement and the interior surface of the component.

14. The process of claim 3, wherein the guide wire includes attachment loops and the bladder is secured within the cavity by connecting the attachment loops to the component.

15. The process of claim 3, wherein the guide wire includes attachment loops and the bladder is secured within the cavity by connecting the attachment loops to a fixture retaining the component in place.

16. The process of claim 1, wherein the bladder is coated with a mold-release compound.

17. The process of claim 5, wherein the restricted portion includes at least one of wound thread, wire, bands and an elastic.

18. The process of claim 1, wherein the bladder is inflated with a fluid and the fluid includes at least one of air, gas, and liquid.

19. The process of claim 18, wherein a temperature of the fluid is heated.

20. The process of claim 1, wherein more than one cavity is formed between the bladder and the interior surface and the process further comprises introducing the polymer resin into the cavities by a runner system.

* * * * *